United States Patent [19]

Kino et al.

[11] Patent Number: 5,073,018

[45] Date of Patent: Dec. 17, 1991

[54] CORRELATION MICROSCOPE

[75] Inventors: Gordon S. Kino; Stanley S. C. Chim; Patricia A. Beck, all of Santa Clara, Calif.

[73] Assignee: The Board Of Trustees Of The Leland Stanford Junior University, Stanford, Calif.

[21] Appl. No.: 419,521

[22] Filed: Oct. 4, 1989

[51] Int. Cl.⁵ ...................... G02B 27/14; G02B 21/08; G01B 9/02

[52] U.S. Cl. .................................. 359/368; 356/351; 359/629

[58] Field of Search .............. 350/507, 509, 510, 169, 350/171, 172, 173, 527, 174, 6.3, 522, 162.13; 250/201.3; 356/237, 360, 376

[56] References Cited

U.S. PATENT DOCUMENTS

| | | | |
|---|---|---|---|
| 3,438,694 | 4/1969 | Reid et al. | 350/171 |
| 4,632,554 | 12/1986 | Pearce | 356/351 |
| 4,863,252 | 9/1989 | McCathy et al. | 350/6.3 |
| 4,948,253 | 8/1990 | Biegen | 356/360 |

OTHER PUBLICATIONS

Principles of Optics, by Born and Wolf, Fourth Edition, 1970, Pergamon Press, pp. 311–312.

*Primary Examiner*—Bruce Y. Arnold
*Assistant Examiner*—James Phan
*Attorney, Agent, or Firm*—Flehr, Hohbach, Test, Albritton & Herbert

[57] ABSTRACT

A correlation microscope including an objective lens for focusing a light beam on an object plane and at least one thin pellicle acting as a beam splitter disposed to intercept the focused beam, a reference mirror between said objective lens and said pellicle to intercept the focused beam reflected by said beam splitter, and a lens for receiving energy reflected by said reference mirror and an object placed at said object plane and focusing the light at an image plane where an interference image is formed.

11 Claims, 6 Drawing Sheets

CORRELATION MICROSCOPE

BRIEF DESCRIPTION OF THE INVENTION

This invention relates to correlation microscopes, and more particularly to correlation microscopes using principles of the Mireau interferometer.

BACKGROUND OF THE INVENTION

Davidson, et al., describe a correlation microscope in their paper entitled, "An Application of Interference Microscopy to Integrated Circuit Inspection and Metrology" appearing in SPIE Proceedings, Vol. 775, Mar. 1987. Basically, the microscope employs a Linnik microscope in a Michelson interferometer configuration. Each beam then passes through one of two identical microscope objectives and reflects off of different reflecting surfaces, a reference and an object surface. The reflected beams recombine to produce superimposed images at an image plane located at the face of a video camera. In operation, the beam path lengths must be within a coherence length of one another; in addition, both the object and reference surface must be at the focal planes of its respective objective lenses.

If the two beams of light are narrowband, are spatially incoherent and have amplitude A and B, A representing the amplitude of the beam reflected from object and B the amplitude being reflected from the reference mirror, and the beam paths are identical, the output signal is of the form $$I = A^2 + B^2 + 2AB \quad (1)$$

If the reference mirror is moved sufficiently far so that the two beam paths differ by more than the correlation length, there is no interference between the two beams, and the output signal becomes:

$$I_O = A^2 + B^2 \quad (2)$$

Subtraction of these signals yields an output of the form $$I_C = 2AB \quad (3)$$

By using electronic processing techniques, it is possible to obtain a product signal or the correlation of the reference and object signals. The image is formed on a TV camera. Processing may be done, for example, by moving the reference plane out of the correlation position and carrying out frame subtraction or using more complicated processes, like Fourier transforming and the spatial filtering the frames taken with different sample plane foci. The simplified treatment given here also gives a rough physical picture of the operation of the microscope when a broadband light source is used.

A system of the type described requires identical objective lenses. The beam path must be matched to a fractional wave length. The microscope elements must be sturdily supported to minimize the effects of vibration. The above adds to the cost and complexity of the correlation microscope.

Another type of interferometer is the Mireau interferometer In this interferometer the reference path and the object path are both in front of a single objective lens. This is accomplished by using two thin pellicles, one of which is used to mount a reference mirror for the reference surface, and the other of which serves as a beam splitter to form the reference and object beams. The advantages of the Mireau interferometer over the use of a Michelson interferometer in the Linnik system are that only one microscope objective is required, so that matched objectives are not needed, and the beam paths are very short, which minimizes the vibration problem. This advantage makes it possible to use a standard microscope support stand, although preferably with vibration isolation. Another advantage of the Mireau interferometer over the Linnik system is that optical alignment is non-critical.

The prior art interferometers are not suitable for use in correlation microscopy because the pellicles are relatively thick, two or more microns, and cause aberration when wide aperture beams are used. Such interferometers are only available for operation with apertures less than 0.5, which severely limits the definition of the system.

OBJECTS AND SUMMARY OF THE INVENTION

It is a general object of this invention to provide an improved correlation microscope.

It is another object of this invention to provide a correlation microscope employing a Mireau interferometer configuration with an ultra thin beam splitting pellicle.

It is a further object of this invention to provide a correlation microscope of the Mireau interferometer type including two ultra thin pellicles made of silicon nitride and one serving as a beam splitter and the other as a support for a reference mirror.

It is another object of this invention to provide a method of forming thin silicon nitride or boron nitride pellicles for use in a correlation microscopes.

The foregoing and other objects are achieved by a correlation microscope which includes a condenser lens for receiving light from a light source and forming a collimated beam, a wide aperture objective lens for receiving said beam and focusing it at an object plane, a reference mirror on the object side of said objective lens, a beam splitter comprising an ultra thin pellicle receiving said focused beam and passing a portion of the beam to said object and reflecting and focusing a portion onto said reflective mirror, the beams reflected from the mirror and from the object being collected by the objective lens and directed to a condenser lens which focuses the combined beams at an image plane.

A method of etching an ultra thin pellicle which comprises forming a thin film on a semiconductor substrate and selectively etching away a part of the semiconductor substrate to provide a window covered by the film supported by the substrate.

BRIEF DESCRIPTION OF THE DRAWINGS

The foregoing objects of the invention will be more clearly understood from the following description, taken in connection with the accompanying drawings, of which.

DESCRIPTION OF A PREFERRED EMBODIMENT

Figure 1:
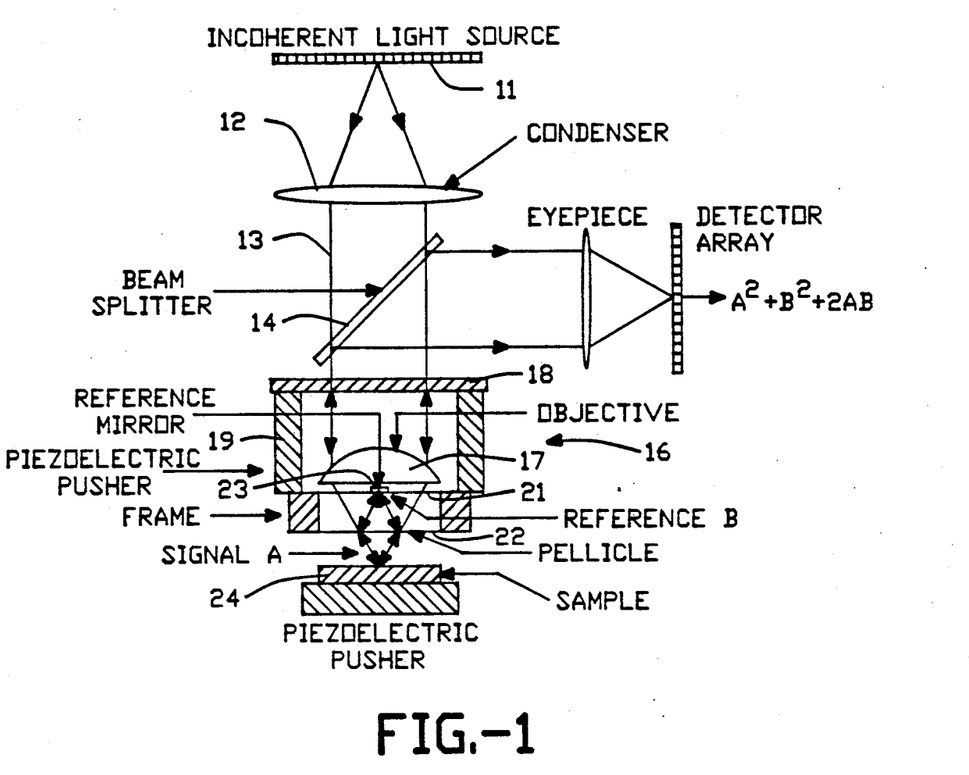
FIG. 1 is a schematic representation of one embodiment of a correlation microscope in accordance with this invention.

Referring now to FIG. 1, the correlation microscope shown includes a light source 11, preferably a spacially and temporally incoherent broadband light source. The light from a point on the source is captured by condenser lens 12 which forms a collimated beam 13 which passes through beam splitter 14 and to a lens and pellicle assembly 16 including an objective lens 17 is supported by a support schematically shown at 18. The lower portion of the support receives and holds a piezoelectric pusher 19 which supports a pellicle assembly which includes pellicle 21 supported on one side of a frame and a pellicle 22 supported on the other side of the frame. The pellicle 21 supports a small mirror 23 and the pellicle 22 serves as a beam splitter reflecting approximately 50 percent of the optical energy impinging thereon and transmitting the other 50 percent. The transmitted light is focused on the sample object 24. The reflected light is focused on the mirror 23 where it is reflected back toward the pellicle and correlates with the reflected light from the sample. The light reflected from the object and the mirror is collected by the objective lens 17 and deflected by the beam splitter 14 to a eyepiece lens 26 where it is focused onto an image plane 27, which may comprise a detector array 28. The output of the detector array with the beams in coherence is $A^2 + B^2 + 2AB$.

As previously described, a drawback of the prior art is that the pellicles are relatively thick, thereby requiring small apertures to avoid aberration of the beam. Thick films also present problems with regard to the reflection from the upper surface to form an effective beam splitter.

Figure 2:
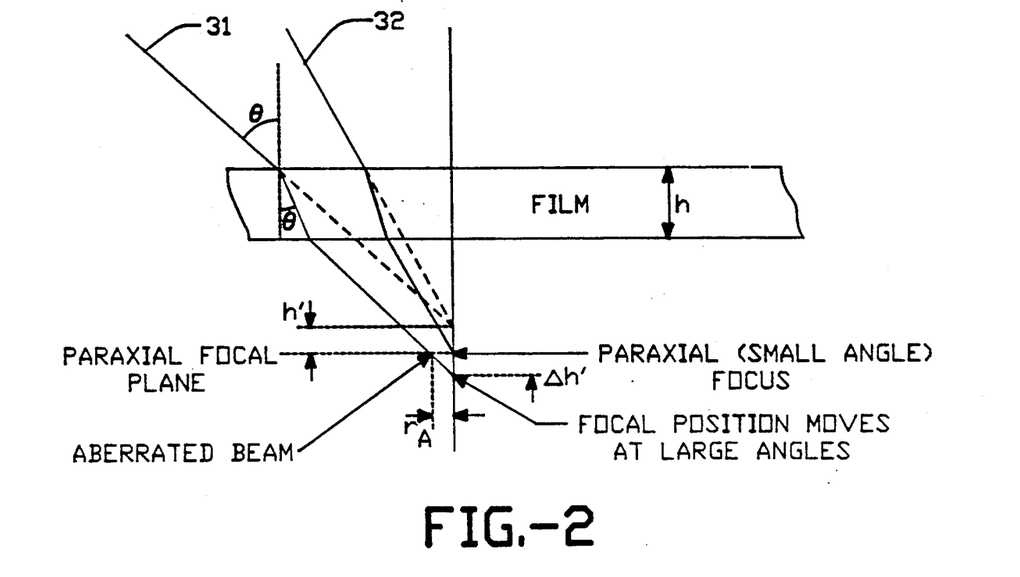
FIG. 2 shows schematically how aberrations are introduced by a pellicle.

Referring to FIG. 2, a pellicle of thickness h is shown having incident beams 31 and 32. The parallax introduced by the film is shown. It is observed that for small angles, beam 32, the parallax is small, whereas for wide angles such as that of beam 31, the parallax is larger. This difference represents the beam aberration if one is to regard the paraxial focal plane as the desired focal plane. It is to be observed that the thicker the film, the larger the aberrations. It is possible to estimate the radius $r_A$ of an aberrated beam by using simple ray optics. If the radius $r_A$ is comparable to the radius of the focused beam, $r_D$ estimated from diffraction theory, then the aberrations are too large and the system is unsuitable as a microscope.

Suppose the angle of incidence to the normal on the film of ray 31 is $\Theta$, and the angle of transmission through the film is $\Theta'$, then by Snell's law, $$\frac{\sin\Theta}{\sin\Theta'} = n_0$$

where $n_0$ is the refractive index of the film. If the thickness of the film is h, it can be shown that to the paraxial (small angle) approximation of optics, the displacement in the z direction or range direction of the focus of an initially perfectly focused beam due to the presence of the film is $$h' = h(1 - 1/n_0)$$

However, as the angles become large, the displacement changes by a distance $\Delta h'$ where $$\Delta h' = h/n_0(1 - \cos\Theta/\cos\Theta').$$

In turn, this implies that at the paraxial focal plane, the ray optic beam size is no longer zero, but instead, the radius $r_A$ of the ray with an initial angle $\Theta$ is now $$r_A = h/n_0(1 - \cos\Theta/\cos\Theta')\tan\Theta$$

This effect is unimportant if the calculated radius of the outer rays of the beam is much less than the radius $r_D$ of the beam calculated by diffraction theory:

$$r_D = 0.61\lambda/\sin\Theta_0$$

where $\lambda$ is the optical wavelength, the numerical aperture of the beam is $NA = \sin\Theta_0$ and the angle $\Theta_0$ is the angle to the axis of the outermost rays.

For the highest definition microscopy, i.e. to minimize $r_D$, it is necessary to work with as wide an aperture beam as possible. Taking $NA = 0.9$, which corresponds to $\Theta_0 = 64°$, and an optical wavelength of 540 nm (the green line of mercury), we find that $r_D$ 366 nm. If we use a thin plastic membrane, say 2 $\mu$m thick, with a refractive index of 1.5, the aberration or radius of the outer rays of the ray optic beam is calculated to be $r_A = 0.62$ h or 1.28 $\mu$m. This is far larger than the diffraction limited size of the beam, and would make it impractical to use such beam splitters in a Mireau interferometer configuration with a wide aperture beam. On the other hand, it is possible to use plastic film pellicles for smaller aperture beams; for instance, with a numerical aperture of 0.5 and $\Theta_0 = 30°$ the radius of the outermost aberrated ray is $r_A = 0.03$ h or 60 nm for a pellicle thickness of 2 $\mu$m. For this beam, the diffraction limited radius is $r_D = 658$ nm, which implies that the aberration would only be about ten percent of the beam size. The use of two pellicles, as in the correlation microscope shown doubles this aberration.

The solution to working with wide aperture lenses is to work with much thinner pellicles, preferably of higher refractive index, since the aberration radius is proportional to pellicle thickness and inversely proportional to the refractive index of the film. With the use of silicon nitride films with a refractive index of $n_0 = 2.04$ at an optical wavelength of 540 nm, and a 0.9 aperture lens, the aberration radius is calculated to be 0.51 h. For an 80 nm thick film, this corresponds to a radius of 40 nm or about ten percent of the diffraction limited beam size. Since it is perfectly possible to use films as thin as 50 nm, aberration can be reduced to a negligible amount.

Figure 3:
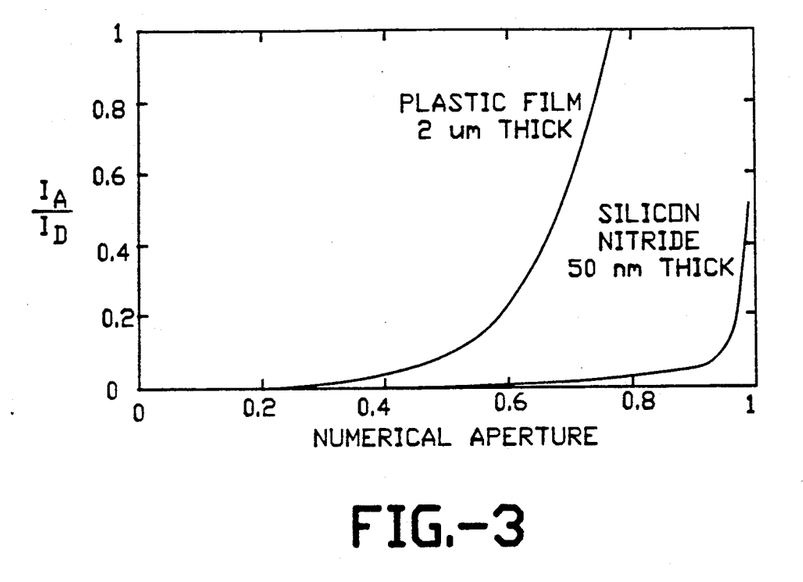
FIG. 3 shows aberration as a function of aperture for pellicles of two thicknesses.

In FIG. 3 there is shown a plot of $r_A/r_D$ as a function of the numerical aperture with light wavelength of 540 nm for a plastic film 2 μm thick with refractive index of $n_0 = 1.5$ and for a silicon nitride film, 50 nm thick with a refractive index of $n_0 = 2.04$. It is seen that the silicon nitride film can accommodate wide apertures, permitting better microscope definition.

Figure 4:
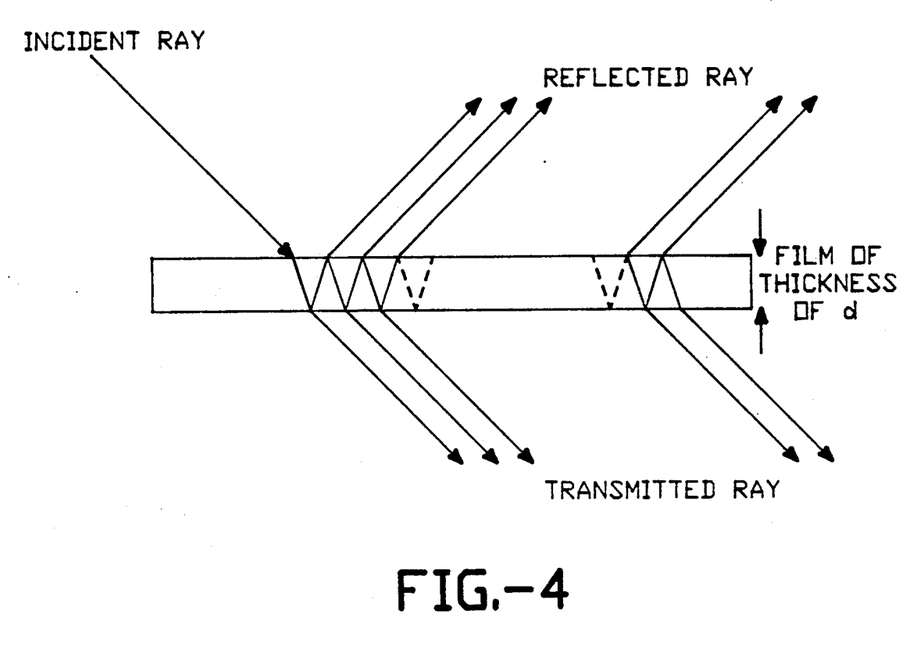
FIG. 4 shows the reflected and transmitted rays in a pellicle.

Referring to FIG. 4, there is shown a ray diagram illustrating the reflection and transmission of incident rays by a thin pellicle of thickness h. The thin pellicle, when serving as a beam splitter 22, should have a constant transmittance and reflectance over the visible spectrum as well as over a range of incident angles and should not introduce aberrations in wide aperture beams. For example, with a numerical aperture of 0.8 in a microscope, the incident angle is as high as 54°. If the wavelength of the light is λ, the refractive index of the dielectric film n and thickness h, the incident angle $\Theta_i$, the refracted angle $\Theta_t$ and the coefficient of reflection r, the optical path difference between two adjacent beams is then given by:

$$D = 2nh/\cos\Theta_t \quad (4)$$

which corresponds to a phase difference of:

$$\delta = D2\pi/\lambda \quad (5)$$

Assuming the dielectric film is lossless, and defining the coefficient of finesse as:

$$F = (2r/h - r^2)^2 \quad (6)$$

the reflected and transmitted light intensities (when the incident light intensity is normalized to 1) are then given by:

$$I_r = F\sin^2(\delta/2)/1 + F\sin^2(\delta/2) \quad (7a)$$

$$I_t = 1/(1 + F\sin^2(\delta/2)) \quad (7b)$$

The coefficient of reflection "Γr" is not the same for TE and TM polarizations which will give different values of F for the two orthogonal polarizations.

$$\text{for TE wave } \Gamma_r = -\sin(\Theta_i - \Theta_t)/\sin(\Theta_i + \Theta_t) \quad (8a)$$

$$\text{for TE wave } \Gamma_r = \tan(\Theta_i - \Theta_t)/\tan(\Theta_i + \Theta_t) \quad (8b)$$

Figure 5:
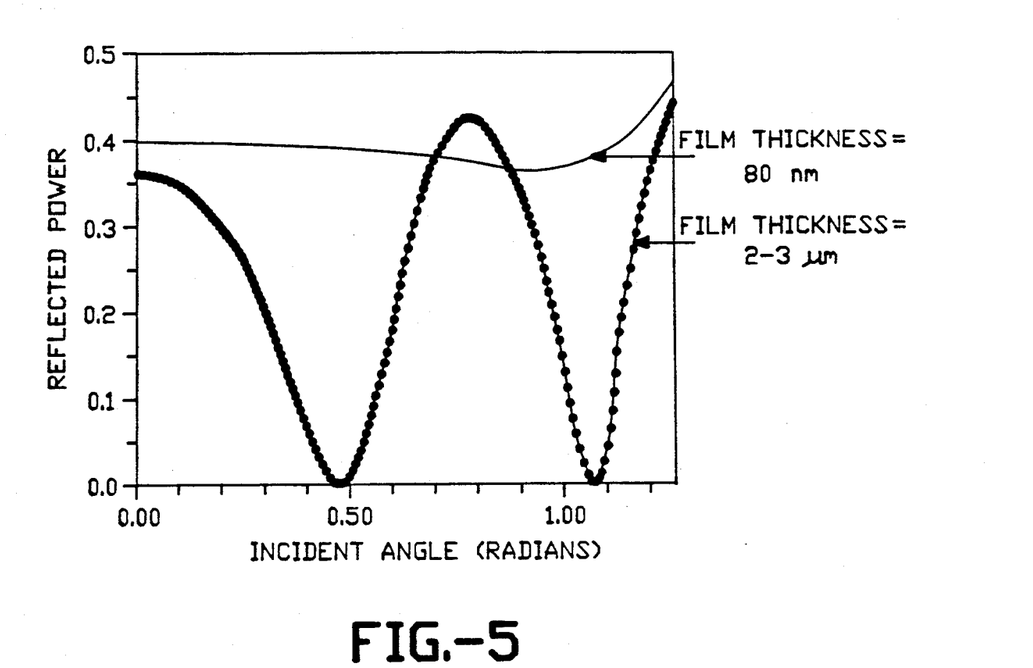
FIG. 5 shows reflected power as a function of incident angle of light rays for pellicles of different thicknesses.
Figure 6:
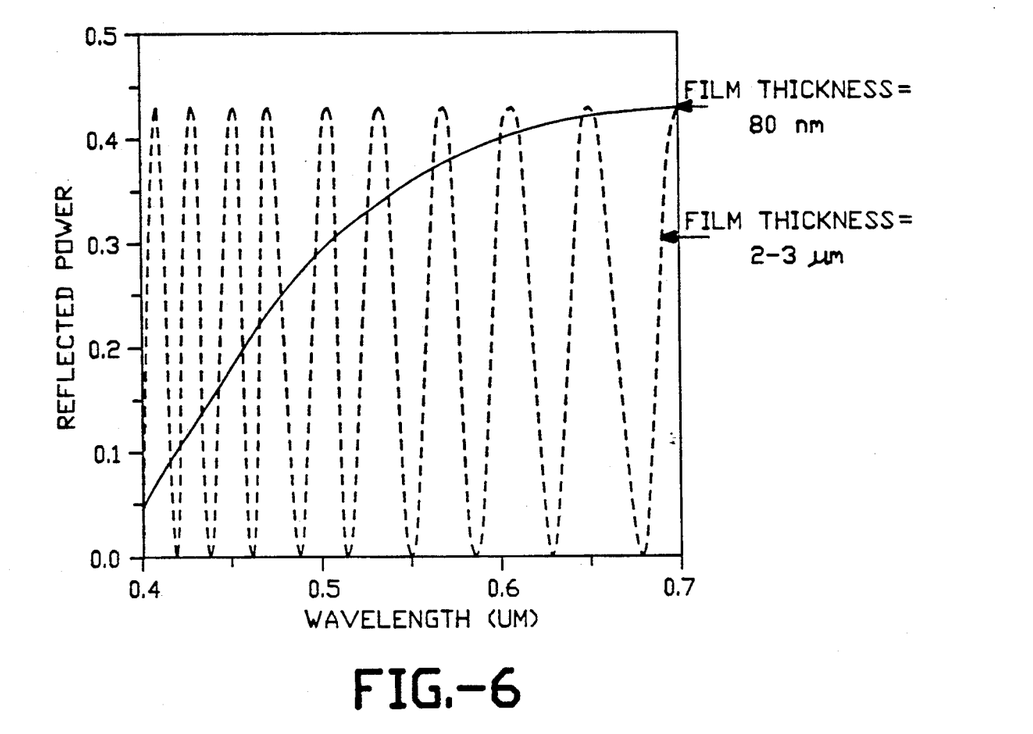
FIG. 6 shows reflection as a function of the wavelength of light for pellicles of different thicknesses.

Clearly, the reflected and transmitted intensities depend on the incident angle "$\Theta_i$" wavelength of incident light "λ" and polarization of incident light. FIGS. 5 and 6 are plots of equation 7 as a function of incident angle and wavelength assuming equal amount of TE and TM components.

It is obvious from these plots that commercial pellicle beam splitters, typically 2-3 μm thick, will exhibit many undesirable ripples over the range of incident angle and wavelengths. Their thickness uniformity is typically only 0.2 μm over a 44 mm² area. This would introduce unacceptable aberrations. On the other hand, thin pellicles in the order of 80 nm thick introduce minimal aberrations over a wide range of incident angles and wavelengths.

It is apparent from the foregoing analysis that ultra thin pellicles are essential if one is to obtain a microscope having high unaberrated definition. In accordance with this invention, thin semi conductor films such as silicon nitride films are employed as the pellicles. These films can be very thin and they have a high index of refraction, both of which minimize aberrations.

In accordance with another feature of the invention, nitride films are grown on the surface of a silicon wafer, a window or pattern is then defined on the other surface of the wafer by photolithographic processes, and the silicon is etched away to leave the thin silicon nitride membrane supported by a surrounding frame.

Figure 7:
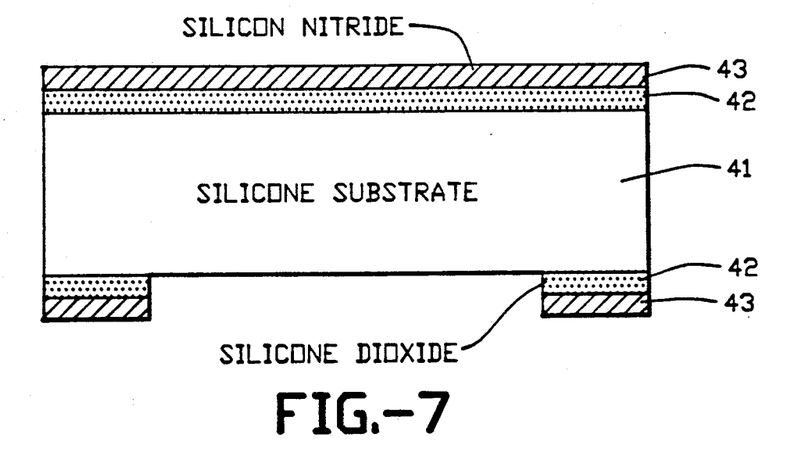
FIG. 7 shows the first step in forming an ultra thin silicon nitride pellicle.

Referring to FIG. 7, there is shown a silicon substrate which may be a <100> oriented double polished silicon substrate 41. This crystalline orientation is particularly suitable for yielding rectangular windows by anisotropic etching. A silicon dioxide film 42 is grown on the surfaces of the silicon substrate. A thin, for example, 300 Å thermal oxide film is suitable. A 100 Å to 1000 Å thick silicon nitride film 43 is deposited on both sides by low pressure chemical vapor deposition. The low pressure chemical gas composition is usually $SiH_2Cl_2$ and $NH_3$. The silicon dioxide film minimizes mismatch and residual stresses which might cause shattering of the thin silicon nitride film.

Figure 8:
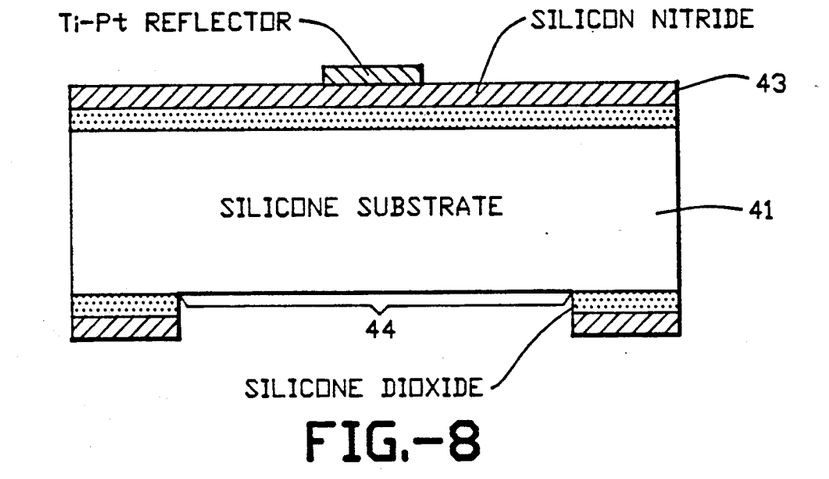
FIG. 8 shows the second step in forming an ultra thin silicon nitride pellicle.

One surface of the silicon substrate with the layers of oxide and nitride is then masked and etched, for example, by dry etching to remove the nitride and the underlying oxide, and leave a window 44. Before completing the etch of the silicon in the window 44 which will expose the nitride which forms pellicle 21 which supports reflecting mirror 23, a metal reflector layer 46 is formed on the surface of the nitride. The mirror may comprise a titanium layer followed by a platinum layer. Platinum is chosen because it is insensitive to attack by the reagents used for etching silicon. The size and location of the mirror is defined on the wafer surface with the aid of infrared alignment through the wafer. A standard lift-off of positive resist in acetone defines the position and size of the metallic mirror. Before the final etch in potassium hydroxide, the mirror is covered with wax to avoid any erosion during the etching process. The window side is then etched in a controlled temperature hydroxide bath, preferably, for example, the bath is held at a temperature of 80° C. with potassium hydroxide concentration of approximately 33%. The silicon and nitride etch rates are 0.9 μm/min and 20 Å/hour respectively. For a 500 μm thick wafer, the total etching time is about 8 hours and the exposed nitride film thickness is reduced to 840 Å. The etched wafer is then cleaned and can be mounted on the ends of the piezoelectric member of FIG. 1. The pellicle 22 is made in the same manner without the mirror forming step.

Figure 9:
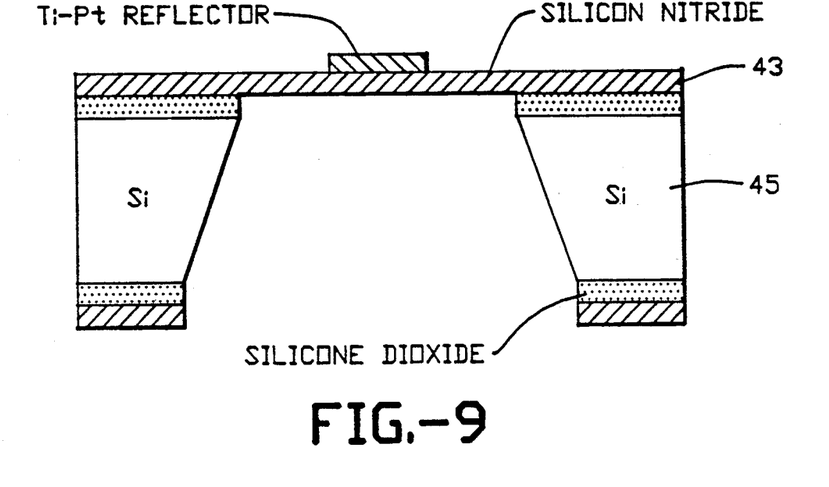
FIG. 9 shows the final step in forming an ultra thin silicon nitride pellicle.

The final cross section is shown in FIG. 9. The pellicle includes a frame 46 which aids in supporting and handling the film. It is apparent that a pellicle can be formed on other substrates. Rather than using preferential etching, the entire top surface may be protected. Other suitable pellicle materials having a high index of refraction are boron nitride, silicon carbide, silicon and other semiconductor materials which can be formed on a substrate which is etched away to expose the film.

Figure 10:
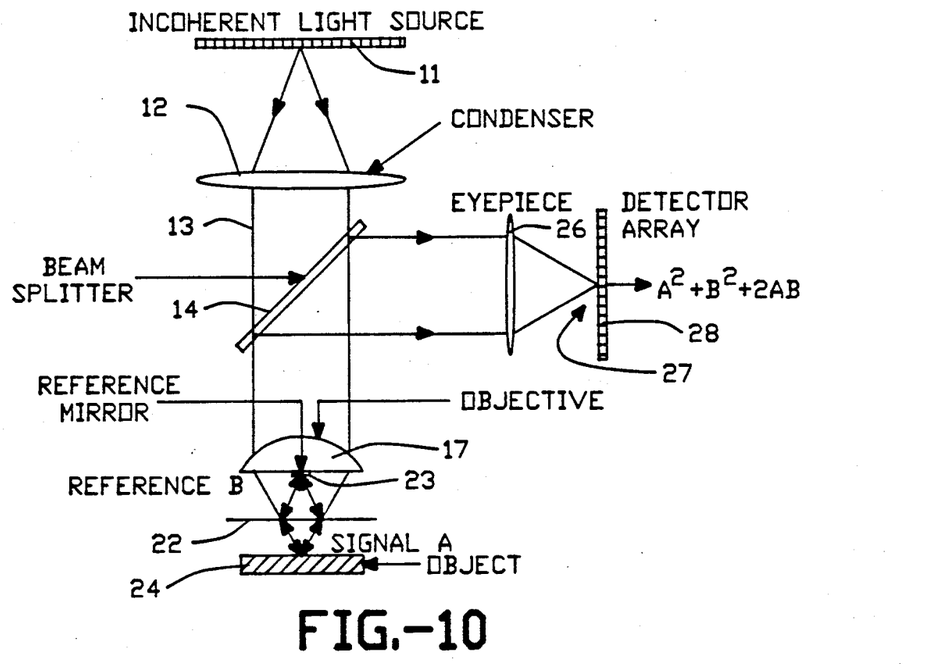
FIG. 10 is a schematic representation of another embodiment of a correlation microscope in accordance with the invention.

An alternative embodiment of the microscope is shown in FIG. 10. In this embodiment, the reflecting mirror is formed directly onto the objective lens, thereby eliminating one of the pellicles and the aberrations introduced thereby. In other respects the microscope is the same as that in FIG. 1 and therefore, has the same reference numbers.

A disadvantage of correlation microscopes of the type described is its slow speed, since considerable electronic processing of the output $A^2+B^2+2AB$ is required to form an image. This difficulty is to a large extent eliminated in the present invention, since the pellicles can be made a part of the objective lens and can be used as an extra element in a microscope turret of a standard microscope or a real-time scanning optical microscope. Thus, the device can be incorporated in a real time Nipkow disk confocal microscope configuration such as shown in U.S. Pat. No. 3,926,500, or in a standard microscope. Real-time measurements can be taken with the confocal microscope, while correlation measurements may be taken only when needed, by rotating the turret to provide additional information. Preferably the turrent is removed when the objective lens and pellicles are used.

Figure 11:
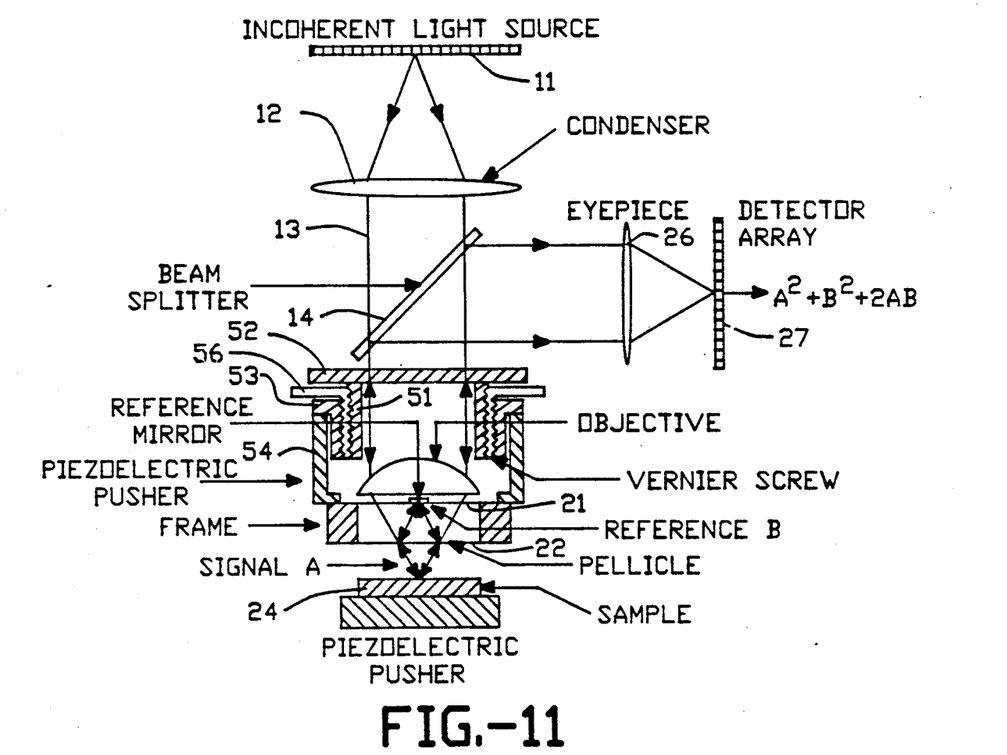
FIG. 11 shows another embodiment of a correlation microscope in accordance with the invention.

A correlation microscope using a long working distance objective lens (2 mm) with a numerical aperture of 0.8 has been constructed and tested. The microscope shown in FIG. 11, where the same reference numbers have been applied to like parts, uses two thin pellicles 21 and 22, one as a beam splitter and the second to support the mirror for the reference beam. Pellicles are formed on silicon substrates as described, and the pellicles and frame are supported by a piezoelectric pusher 54. A vernier screw supporting structure makes it possible to adjust the relative lengths of the beams in the reference and the signal paths. The supporting structure may include a support cylinder 51 supported from the lens mount 52. A second cylinder 53 supports the piezoelectric pusher and pellicles 21 and 22. A vernier screw 56 threadably engages the two cylinders and moves them, one relative to the other. When the two paths are identical, maximum output is obtained. When they are much more than a correlation length apart, the signals from the two paths do not interfere; only their intensities add.

In addition, the sample being tested can be moved with a piezoelectric pusher 54. In this case, moving the piezoelectric pusher 54 not only changes the path, but defocuses the beam incident on the sample while keeping the reference beam in focus. By taking a series of images 1/30 sec apart with the sample moved to different plane, a complete correlation function for each spot at point X, Y, Z in the image can be obtained. By the use of Fourier transform techniques, one can then reconstruct the image at any plane z.

All microscopes are limited in resolution because in Fourier transform terms, the Fourier transform of the point spread function or point response of the lens falls off at higher spatial frequencies. The response as a function of spatial frequency of a correlation microscope or scanning optical microscope has a quasi triangular shape, known as "the Chinese Hat function," FIG. 12.

Figure 12:
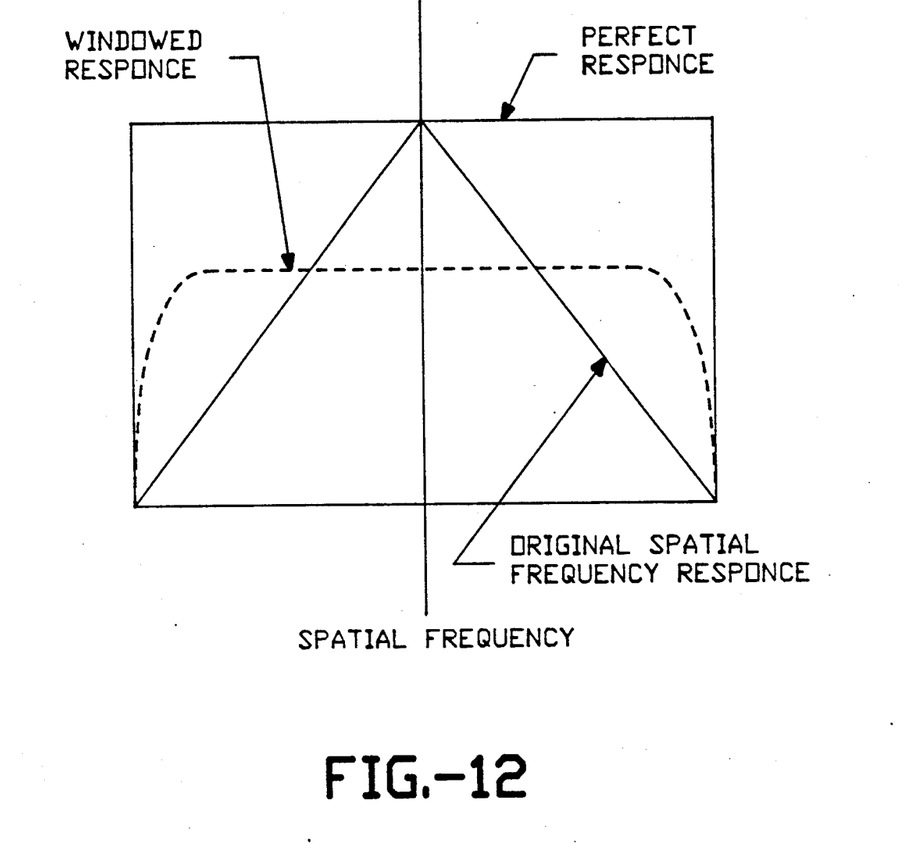
FIG. 12 shows the response of a correlation microscope as a function of spatial frequency.

The original spatial response of the microscope is shown in the figure. An ideally corrected response is shown in the form of a rectangle. This response would require the original response H(f) to be multiplied by an inverse filter function $W(f)=1/H(f)$ to produce the rectangular shape. Such an inverse filter would have to provide infinite amplification at the edge of the band and would amplify noise to unacceptable amounts. Instead, the function W(f) is normally rounded off to produce a function something like that shown as the dashed line in the figure. By such stratagems it is, in principle, possible to improve the resolution by a factor of 1.5 or more.

The correlation microscope is well suited to this purpose, since unlike other microscopes, both the amplitude and phase of the Fourier transform of the spatial response is available in the processing. Computer processing of the output of the microscope can be used to improve the spatial frequency response and hence, improve the spatial resolution. The availability of amplitude and phase information is of great importance and can be employed in useful and powerful ways to recognize particular shapes and differentiate one shape from another.

Thus, there has been provided an improved correlation microscope employing thin silicon nitride pellicles. The material from which the pellicles are formed has a high index of refraction and can easily be formed by standard techniques used in the semiconductor industry, such as vapor deposition of thin films, masking and etching. Another advantage of this microscope is that, because both the reference beam and signal beam pass through the same lens and suffer the same distortions, and the product of the complex conjugate of one signal is taken with the other, the effect of aberrations is removed. Thus, chromatic aberration of the objective is eliminated, as are all other forms of aberration, such as spherical aberration, which distort the range resolution of the objective.

The microscope provides signals, including both amplitude and phase information. This information can be processed to provide improved resolution, making it possible to recognize particular shapes and to differentiate one shape from another.

What is claimed:

1. A correlation microscope comprising
   a condenser lens for receiving light from a light source and forming a collimated beam,
   a wide aperture objective lens for receiving and focusing said collimated beam,
   a beam splitter comprising a pellicle having a thickness less than 1000 Å for receiving said focused beam and passing a portion of said focused light to focus on an object plane where it is reflected by an object placed at said plane,
   a mirror mounted on said objective lens positioned to receive the focused light reflected by said pellicle and reflecting it back toward said pellicle,
   said objective lens receiving light reflected by said mirror and light reflected by said object ad directing the light back toward said light source,
   means for intercepting the directed light and redirecting the light, and
   a lens positioned to receive said redirected light and focus the light on an image plane where it forms an interference image.

2. A correlation microscope comprising
   a condenser lens for receiving light from a light source and forming a collimated beam,
   a wide aperture objective lens for receiving and focusing said collimated beam,
   a beam splitter comprising a first pellicle having a thickness less than 1000 Å for receiving said focused beam and passing a portion of said focused light to focus on an object plane where it is reflected by an object placed at said plane,
   a second pellicle having a thickness less than one micron mounted between said beam splitter and said objective lens,
   a mirror mounted on said second pellicle to receive the focused light reflected by said first pellicle and reflecting it back toward said first pellicle, said objective lens receiving light reflected by said mirror and light reflected by said object and directing the light back toward said light source, means for intercepting the directed light and redirecting the light, and a lens positioned to receive said redirected light and focus the light on an image plane where it forms an interference image.

3. A correlation microscope comprising a condenser lens for receiving light from a light source and forming a collimated beam, a wide aperture objective lens for receiving and focusing said collimated beam, a beam splitter comprising a first pellicle having a thickness less than 1000 Å for receiving said focused beam and passing a portion of said focused light to focus on an object plane where it is reflected by an object placed at said plane, a mirror disposed between said first pellicle and said objective lens positioned to receive the focused light reflected by said first pellicle and reflecting it back toward said first pellicle, a second pellicle mounted between the first pellicle and the objective lens, means for mounting said first and second pellicle for movement towards and away from said condenser lens, said objective lens receiving light reflected by said mirror and light reflected by said object and directing the light back toward said light source, means for intercepting the directed light and redirecting the light, and a lens positioned to receive said redirected light and focus the light on an image plane where it forms an interference image.

4. A correlation microscope as in claims 1, 2 or 3 in which said pellicle comprises a thin film of semiconductor material.

5. A correlation microscope as in claims 1, 2 or 3 in which said pellicle comprises semiconductor material selected from the group consisting of silicon nitride, boron nitride, silicon carbide or silicon.

6. A correlation microscope as in claims 1, 2 or 3 in which said pellicle comprises a thin film of silicon nitride supported by a frame of semiconductor material.

7. A correlation microscope as in claims 1, 2 or 3 in which the aperture is greater than 0.7.

8. A correlation microscope comprising a condenser lens for receiving light from a light source and forming a collimated beam, a wide aperture objective lens having a numerical aperture greater than 0.7 for receiving and focusing said collimated beam, a beam splitter comprising a first pellicle having a thickness less than 1000 Å for receiving said focused beam and passing a portion of said focused light to focus on an object plane where it is reflected by an object placed at said plane, a mirror mount comprising a second pellicle having a thickness of less than 1000 Å, a mirror mounted on said second pellicle, piezoelectric means for mounting said pellicle spaced from one another with said second pellicle positioned between the objective lens and the first pellicle to receive the focused light reflected by said first pellicle and reflecting it back toward said first pellicle, said objective lens receiving light from said mirror reflected by said first pellicle and from said object and directing the light back toward said light source, means for intercepting said reflected light and redirecting the light, and a lens positioned to receive said redirected light and focus the light on an image plane where it forms an interference image.

9. A correlation microscope as in claim 8 in which said pellicles each comprise a thin film of semiconductor material selected from the group silicon nitride, boron nitride, or silicon carbide.

10. A correlation microscope as in claim 9 in which said pellicles are supported by a frame of semiconductor material mounted on said piezoelectric mounting means.

11. A correlation microscope as in claim 9 in which said pellicles have a thickness in the range of 300 Å-1000 Å.

* * * * *